J. E. DUKE.
AUTOMATIC HOSE CLAMP.
APPLICATION FILED JULY 25, 1914.
1,180,113.
Patented Apr. 18, 1916.
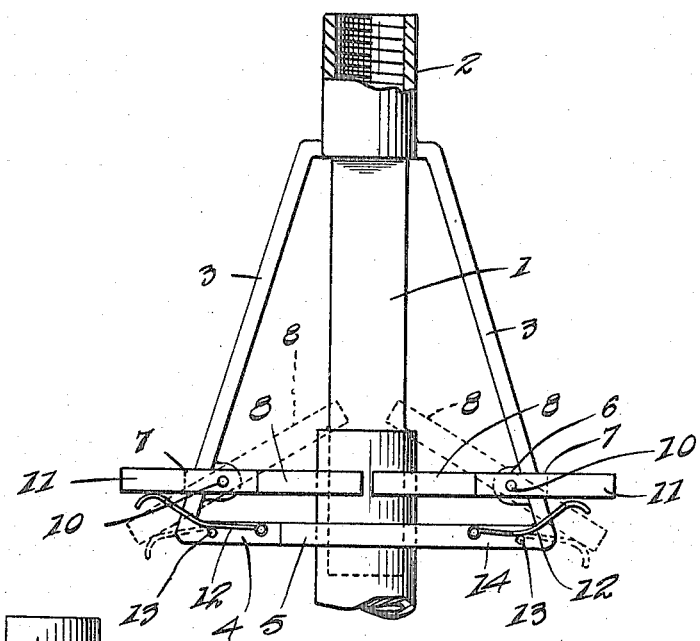
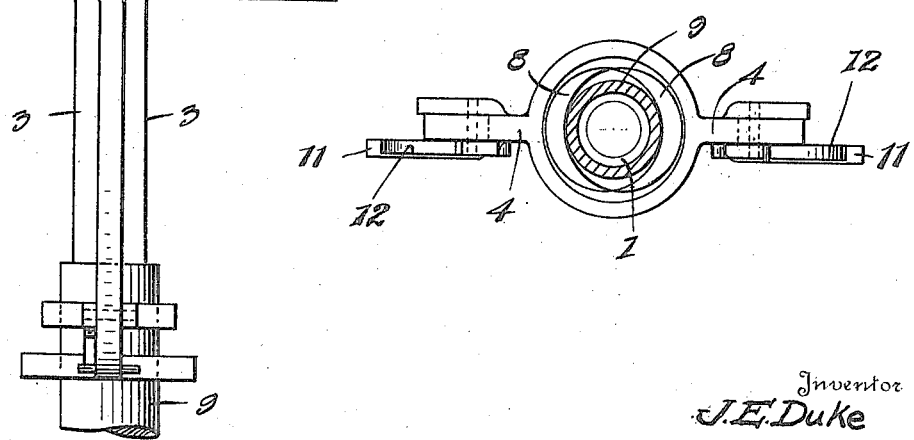

UNITED STATES PATENT OFFICE.

JOSEPH E. DUKE, OF BIRMINGHAM, ALABAMA.

AUTOMATIC HOSE-CLAMP.

1,180,113.  Specification of Letters Patent.  Patented Apr. 18, 1916.

Application filed July 25, 1914. Serial No. 853,091.

*To all whom it may concern:*

Be it known that I, JOSEPH E. DUKE, a citizen of the United States, residing at Birmingham, in the county of Jefferson and State of Alabama, have invented certain new and useful Improvements in Automatic Hose-Clamps; and I do hereby declare the following to be a full, clear, and exact description of the invention, such as will enable others skilled in the art to which it appertains to make and use the same.

This invention relates to hose clamps and one of the principal objects of the invention is to provide a hose clamp which will be reliable in action, simple in construction, and which will hold a hose firmly clamped automatically without the use of screw threads for connecting the hose to a plug.

Another object of the invention is to provide a hose clamp for connecting a hose to a plug which will operate automatically and which will firmly clamp the hose to the connection, and which will exert greater clamping power whenever the force of water or steam through the hose is increased.

Still another object of the invention is to provide a hose clamp in which the connection is made merely by inserting the hose into the clamp, and permitting the clamp members to close upon the hose and to exert greater power as the force is increased as the water passes through the hose.

These and other objects may be attained by means of the construction illustrated in the accompanying drawing, in which, Figure 1 is a side elevation of an automatic hose clamp made in accordance with this invention and showing a piece of hose broken away and clamped in place and the opposite end of the hose clamp being broken away to show the threaded connection to be attached to a plug, Fig. 2 is a section on the line 2—2 of Fig. 1, looking in the direction indicated by the arrow, and Fig. 3 is a bottom plan view.

Referring to the drawing, the numeral 1 designates the intake pipe provided with a threaded nozzle 2 for connection to a plug, and integrally connected with the nozzle portion 2 are the oppositely inclined spaced members or arms 3, said members being bent inwardly at 4 and provided with a central aperture 5.

Pivotally connected to lugs 6 extending inwardly from the member 3 are the clamps 7, said clamps each having a curved jaw member 8 which extends about half way around the hose 9 connected to the lower or outer end of the intake pipe 1. The jaw members or clamps 7 are each pivoted at 10 to the lugs 6, and provided with an outwardly extending portion 11 which serves as a finger hold to operate the clamps for disconnecting the hose from the intake pipe 1. Springs 12 are connected to the member 4 and said springs bear against the ends 11 of the clamp, said springs being provided with a stop pin 13.

From the foregoing it will be obvious that when the hose 9 is placed upon the end of the intake pipe 1, the clamps 7 will automatically engage the hose and hold it firmly connected to the intake pipe 1. When it is desired to release the hose from the intake pipe 1, the finger holds 11 are engaged and the clamp members 8 are thrown up into the dotted line position shown in Fig. 1.

From the foregoing it will be obvious that a hose clamp made in accordance with this invention may be used on water, steam, gas or other connections and will operate automatically to clamp the hose firmly and reliably in place on the intake pipe without the use of wrenches or screw threads, and that the operation of connecting the hose to the clamp is simple and quick.

Various changes may be made in the details of construction without departing from the spirit and scope of the invention as defined in the claims.

What is claimed is:—

1. A hose clamp provided with an intake pipe, a threaded nozzle connected to said pipe, arms connected to and extending downwardly from said nozzle, their lower ends extending inwardly, forming a supporting member provided with a central opening therein, a pair of clamps pivotally secured to the said arms intermediate their ends, the inner ends of said clamps being substantially semi-circular and their outer ends bifurcated forming fingers, springs engaging the outer fingers of the clamp forcing the same downwardly into engagement with the hose when in use.

2. A hose clamp comprising an intake pipe, a nozzle secured to the intake pipe, a pair of arms on opposite sides of said nozzle and extending downwardly therefrom, the lower ends of said arms extending inwardly, forming a supporting member provided with a central aperture in the inwardly bent portion thereof, a pair of clamp members, having one of their ends bifurcated and the opposite ends provided with semi-circular extensions surrounding the arms at a point above the inwardly extending portion and pivotally connected to said arms, springs secured to the inwardly extending portion of the arms and engaging the bifurcated arm portion of the clamping members forcing the semi-circular extensions downwardly into engagement with the hose for holding the same when in use.

3. A hose clamp comprising an intake pipe, a nozzle formed on said intake pipe, a pair of arms on opposite sides of the nozzle and diverging downwardly therefrom, the lower terminals of said arms extending inwardly, forming a supporting member and provided with a central opening in the inwardly bent portion of the arm, a pair of clamps pivotally connected to the arms, the inner ends of said clamps being provided with curved jaw members, their outer ends being bifurcated forming fingers, springs carried by the supporting member for engaging the fingers of the clamp for forcing the same downwardly into engagement with the hose surrounding the intake pipe when in use.

In testimony whereof I affix my signature in presence of two witnesses.

JOSEPH E. DUKE.

Witnesses:
A. M. GALLUPS,
CARL HOLCOMB.

Copies of this patent may be obtained for five cents each, by addressing the "Commissioner of Patents, Washington, D. C."